June 14, 1955 W. E. FOLKERTS 2,710,596
POWER STEERING MECHANISM
Filed Oct. 4, 1952 3 Sheets-Sheet 3

INVENTOR.
Walter E. Folkerts
BY
Harness and Harris
ATTORNEYS.

United States Patent Office 2,710,596
Patented June 14, 1955

2,710,596

POWER STEERING MECHANISM

Walter E. Folkerts, Hazel Park, Mich., assignor to Chrysler Corporation, Highland Park, Mich., a corporation of Delaware Application October 4, 1952, Serial No. 313,134

8 Claims. (Cl. 121—41)

This application relates to power boosters, particularly to hydraulic power-boost steering mechanisms of the so-called unitary or concentric construction in which hydraulic forces of reaction are utilized to provide feedback to the operator, thus giving the operator a sense of the road. It is a specific object of the present invention to provide such a power boost steering mechanism which has an operator-operated control valve and which is controlled thereby in a manner such that the valve is self-centering from its own combined action and direct relationship to these hydraulic forces of reaction, owing solely to an inherency of the valve structure as designed. The hydraulic forces necessarily produce a pressure reaction proportional to a selected one of the existing hydraulic pressures in the system, for instance, the pump pressure itself which is in turn proportional to the magnitude of the resistance being overcome by the hydraulic power, and such pressure reaction may be supplemented if desired by a mechanical spring reaction which will afford a substantially linear type of feel-back acting in conjunction with and in addition to the proportional pressure feel-back just described.

The components for conventional power steering mechanisms are ordinarily looked on as including a pump component for circulating pressure fluid such as oil, glycerine, or the like through the rest of the components which are arranged in series and include a reservoir, a power cylinder or motor containing a pressure movable member which actuates the steering mechanism, and distributing means usually in the form of a control valve for discriminately applying the fluid pressure to the power cylinder to actuate the steering mechanism. The pressure fluid from the steering mechanism is preferably returned to the reservoir for re-circulation. Power steering mechanisms generally and, particularly the unitary concentric type of steering mechanism such as the one hereinafter described, are preferably of the open valve type, that is to say, so constructed that when the valve-controlled mechanism is idle, there is free passage therethrough for the pressure fluid, and the control valve thereof is connected for direct movement with an operator-operated actuator which latter is also mechanically connected through a lost motion joint to the element to be steered such that manual power may be applied to the steered element in the case of emergencies when pressure fluid is unavailable. The valve is normally disposed in a neutral or central relative position, and when it is disturbed by the actuator to assume an off-center position, the steering mechanism is so constructed that pressure will be built up in the pressure fluid at a time previous to the time when all of the slack is taken up in the lost motion joint, and fluid pressure will be differentially exerted on the pressure movable member or piston in the fluid motor so as to cause the piston to actuate the steered element until the valve is restored to the undisturbed neutral position. In the unitary steering mechanism such as that to be described, the lost motion joint employed is located for convenience of manufacture and for ease of adjustment of the associated structure following assembly, at a point external to the motor and valve and in the direct line of motion thereto leading from the operator-operated actuator. The degree of take-up in the lost motion device is equal to the degree of relative movement or disturbance of the control valve device, and such movement of either of these two devices is in effect a measure of the magnitude of resistance being encountered by the actuator.

An object of the present invention is the provision of such a control valve device as the foregoing for concentric steering mechanisms which function by the force of pressure reaction at the prime point of disturbance to give an inherent sense of feel at that point and communicated to the operator.

Another object is to provide an operator-operated valve controlled unitary concentric steering gear having an intervening spring-loaded lost motion joint in which the joint functions in the expected capacity of providing for lost motion against a linear type resistance of "feel-back," and in which the control valve inherently develops an hydraulic force reaction manifesting itself upon initial motion of collapse of the joint to help prevent further collapse of the joint.

A further object is to provide a concentric power steering gear of the foregoing hydraulic type incorporating a self-centering valve element and a spring-loaded lost motion joint in series therewith, in which the valve element functions in the unexpected capacity of centering itself by properly utilizing hydraulic forces of reaction whereas the lost motion joint, at the same time and independently of the generation of the reaction force at the valve, performs the dual function of providing for lost motion in its expected capacity and also providing for mechanical or linear feel-back to the operator of the steering gear.

Another object of the invention is to provide a power steering valve-operating-rod and a freely movable control valve operated thereby which is, irrespective of the operating position to which it is moved, self-centering with respect to a central reference line which in effect marks a state of substantial hydraulic balance. A further object of at least one of the presently disclosed embodiments of the invention is the provision of such a power steering valve-operating-rod and in association therewith, a valve controlled thereby which is arranged to oppose and cancel out, at least in the extreme positions of the valve, any force of hydraulic unbalance which though being of a minor nature, inheres in and originates at the valve operating rod.

Further features, objects and advantages will either be specifically pointed out or become apparent when for a more complete understanding of the invention, reference is made to the following written description taken in conjunction with the accompanying drawings in which:

Figure 1:
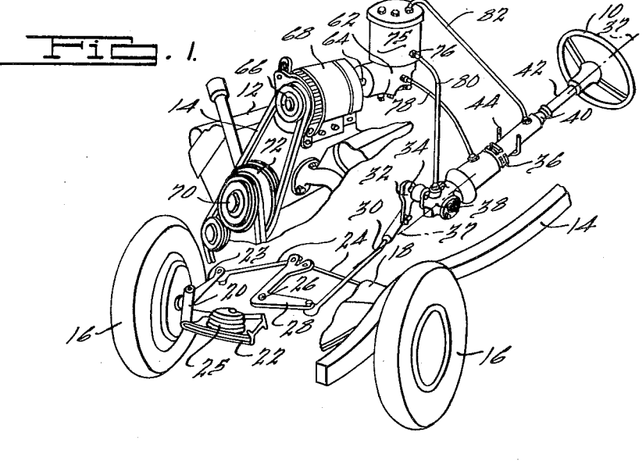
Figure 1 is a perspective view of a power-steered vehicle to which the invention is shown applied.

In Figure 1 of the drawings, a steered vehicle illustrative of the general type to which the invention may be applied, is shown as having a manually actuated steering wheel 10, a propulsion power plant 12, a body-supporting frame 14, and running gear for suspending the vehicle and including a pair of steerable front wheels 16 supported from a crossmember 18 forming a portion of the vehicle frame 14. Each wheel of the pair of wheels 16 is incorporated in a so-called independent front suspension which is shown to include a set of one or more vertically spaced arms 22, a wheel spindle and knuckle support 20 articulately connected to the outer ends of the arms 22, a load spring 25 disposed between each of the lower arms 22 and the frame crossmember 18, and a steering arm 23 for each of the front wheels 16. Each of the steering arms 23 has an inwardly directed tie rod 24 connected thereto and the relatively inner ends of the tie rods 24 are pivotally connected to one arm of a bellcrank 28 pivotally supported to swing about a pivot 26 affixed to the frame front crossmember 18. A rearwardly extending drag link 30 is pivotally connected at the front to the other arm of the bellcrank 28 and is supported at its rear end by a pitman arm 32 splined to a transversely disposed rockshaft 34. It is through the rockshaft 34 and associated linkage just described, that the steering mechanism of the steered vehicle is connected to the pair of front wheels 16. A multi-section steering casing 36 is provided which has a longitudinal axis 37 and which is of generally longitudinally elongated shape between its respective lower and upper ends indicated at 38, 40. The lower end 38 of the casing 36 receives the rockshaft 34 journalled in bearings therein so as to be generally transversely arranged to and out of the plane of the longitudinal axis 37 of the casing 36. The upper end 40 of the casing 36 receives a steering-shaft-containing steering column 42 which is arranged concentrically therewith along the axis 37. The steering column 42 supports the steering wheel 10. An insulated support bracket 44 of general U-shape is provided so as to mount the casing 36 to the instrument panel and dash board structure of the vehicle, not shown. The multi-section casing 36 contains a valve-controlled piston which combines therewith to form a fluid-supplied power motor which is used in a power steering unit to apply power to operate the steering mechanism of the vehicle.

The power steering unit has a source of fluid pressure (and the pressures involved may be of the order of 600–800 p. s. i. above atmosphere at times) which is indicated at 62 and is positively driven by a pump shaft 64 flexibly coupled in tandem to a generator shaft 66 which drives the rotor of a generator 68. The propulsion power plant 12 selected for illustration in Figure 1 is a V-8 engine to which the generator 68 is mounted, and the engine includes a water pump shaft 70 which is belt-driven from the engine and has a sheave 72 keyed thereto. By means of a V belt 74, the sheave 72 is connected to a corresponding sheave on the generator shaft 66 and positively drives the pump shaft 64 at speeds directly proportional to engine speed. Thus as the speed of the power plant 12 varies, so varies the shaft speed of the generator 68 and so also varies the shaft speed of the drive shaft 64 for the source of pressure 62. The source of pressure 62 includes a reservoir 75 from which a pump, appearing therebelow in outline, draws pressure fluid and pressurizes the same and then transmits the pressure fluid through a supply pipe 78 connected directly to the steering unit casing 36. The pressure system used herein is preferably of the re-circulating type and thus, a return line 80 is provided for returning the pressure fluid from the lower end 38 of the casing 36 to a filter containing inlet 76 to the reservoir of the pressure fluid source 62.

For a more complete understanding of the pressure fluid source 62, reference may be had to the source of pressure fluid similarly numbered 62 in the copending application Serial No. 271,187, filed February 12, 1952 in the name of William A. Hunter and assigned to the assignee of this invention. Such pressure fluid source 62 forms no per se part of the present invention.

A seepage line 82 is provided between the upper end 40 of the casing 36 and the top of the reservoir tank 75 at the source of pressure fluid 62.

Figure 2:
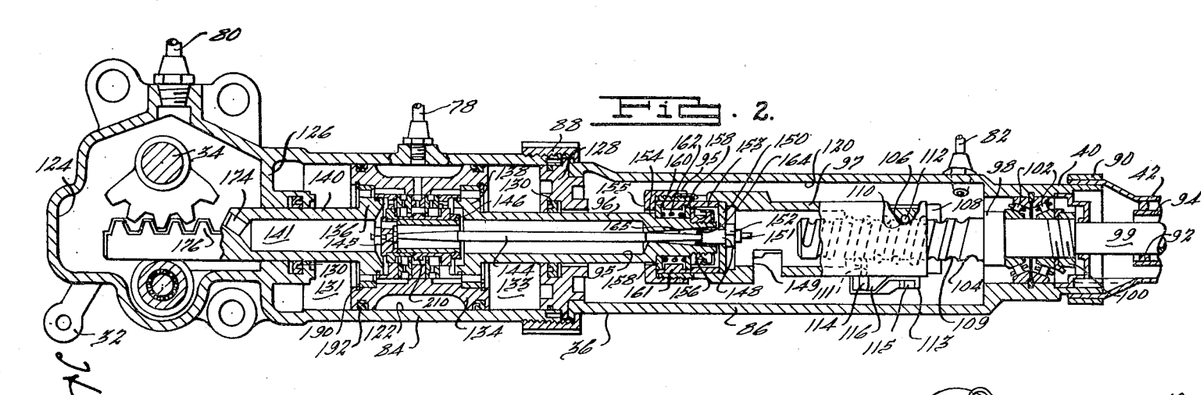
Figure 2 is a longitudinal section in elevation of the power steering unit of the vehicle of Figure 1.

In Figure 2, the multi-section casing 36 is seen to comprise a one-piece lower casing part 84 and a one-piece upper part 86, these casing parts being secured together by a nut 88 having an inwardly directed flange at one end thereof and a set of internal threads at the other end. The upper end 40 of the upper casing part 86 is received within a flare formed in the lower end of the steering column 42 and is held in place by a clamping band 90. The steering column 42 contains an impregnated fabric bearing 92 formed of antirattle material which slidably receives and journals the lower extremity of a transmission ratio selector shaft 94 such that the shaft 94 is both rotationally and axially shiftable within the bearing 92. The elongated casing 36 receives a pair of axially aligned, threadedly connected shafts, one shaft of which is of two-piece construction incorporating a lost motion joint 95 therein and comprising a tubular piston rod portion 96 provided with a hollow interior 95 and a tubular nut portion 97, and the other shaft of which being a tubular steering shaft 99 which is rotatably connected at its upper end to the steering wheel 10.

The steering shaft 99 is concentrically arranged within the ratio selector shaft 94 which is hollow, and while the steering shaft 99 is rotatable in the same manner as is the ratio selector shaft 94, the steering shaft 99 is, nevertheless, held firmly against any and all axial shift in the following fashion. The shaft 99 has a shoulder 98 which is opposed in spaced relationship thereto by a nut 100 threadably received on the steering shaft 99. Surrounding the shaft 99 and received in the space between the shoulder 98 and the nut 100, a span of tapered roller bearings 102 is provided which rotatably holds the shaft 99 against any axial movement. A worm 104 is formed on the lower end of the steering shaft 99 and is received within a worm nut 106 which is arranged concentrically therewith and integrally incorporated in the tubular nut portion 97. The lateral sides of the worm nut 106 are flat and engage a set of opposed flat inwardly directed cheeks 108 formed on the inner surface of the upper casing part 86 which provide a trackway for the worm nut 106 and prevent any rotative motion of the latter. The worm nut 106 incorporated in the tubular nut portion 97, while being prevented from rotation by means of the cheeks 108, is nevertheless slidable longitudinally inside the upper casing part 86. The respective outer and inner peripheries of the worm 104 and the nut 106 are provided with a pair of single pitch grooves 109, 110 respectively, having corresponding pitch and containing a continuous series of balls 112. Provision is made for a return channel or ball conveyor by boring a hole from one side of the worm nut 106 to an intersection with the thread of the nut at two spaced locations on the nut so as to span exactly 2½ of the single pitch threads thereof. These holes, one of which is indicated at 111, are counterbored to receive a ball conveyor which defines an inner bore of such size as will permit the balls to pass radially therethrough and which is secured to the worm nut 106 by means of a bracket 113 and a set of screws 115. The ball conveyor comprises convenable semi-cylindrical sections 114, 116 and is so located in the bracket 113 that the sections are held in a companion mating relationship together. Each of the semi-cylindrical sections 114, 116 has a lip at one extremity thereof which is seated in the groove 109 of the worm 104 and inclined forwardly so as to scoop up the balls out of the groove.

The upper casing part 86 and the lower casing part 84 combine to provide a series of longitudinally successive chambers 120, 122 and 124. The chamber 120, disposed wholly within the upper casing part 86, serves as a seepage or fluid collecting chamber which communicates directly with the reservoir of the pressure fluid source 62, Figure 1, by means of the seepage pipe 82. The chamber 124, which serves as a fluid return chamber, is separated by means of a transverse partition 126 from the chamber 122, which latter provides a working cylinder formed in the lower casing part 84. The working cylinder 122 is in turn separated from the seepage collecting chamber 120 formed in the upper casing part by means of another transversely disposed partition 128 which necessarily has a spaced-apart relationship with respect to the previously noted transversely disposed partition 126. The transversely disposed partition 128 is secured in the bridging structure between the casing parts 84 and 86, and is held in place by means of the nut 88. Each of the spaced-apart transverse partitions 126, 128 contains a lipped seal 130 preferably of synthetic rubber and having the respective lips thereof each extending in the direction of the other seal. The working cylinder 122 slidably receives a pressure movable, double-acting passaged piston member 134 for reciprocative movement therein which divides the cylinder 122 into two working chambers 131, 133, one at each end of the piston 134. The piston 134 incorporates a pair of end structures 136, 138 secured thereto by snap rings and providing a pair of oppositely extending hollow piston rods, one of which is constituted by the tubular piston rod portion 96 which is integral with the piston end structure 138, and the other being a tubular piston rod 140 having a hollow interior 141 and being integral with the piston end structure 136. The hollow piston rod 96 contains a valve-operating-rod 144 connected at its inner end 145 to a single control valve element 146, and threaded at its outer end 148 so as threadably to engage a transversely disposed blanking element 150 provided in the tubular nut portion 97 adjacent a transverse circumferentially extending slot 149 through the side of the nut portion 97. The extreme end of the threaded rod portion 148 is non-circular in cross section at 151 and is disposed adjacent the tool opening or slot 149 so as to receive an adjusting tool by means of which the valve-operating-rod 144 is threadably adjusted with respect to the blanking element 150.

A locknut 152 is received on the threads 148 for locking the valve-operating-rod 144 relative to the blanking element 150 and the nut portion 97. When the steering shaft 99 is rotated, the rotary motion thereof is converted into reciprocative motion of translation by means of the worm and worm nut 104, 106 and such motion of translation is in turn imparted to the tubular piston rod portion 96 and to the valve-operating-rod 144 by reason of the structure now set forth. The tubular piston rod portion 96 has a shoulder 154 which is opposed by a nut 156 threadably received on the end of the piston rod 96. In the space between the shoulder 154 and the nut 156, a pair of lost motion elements 158 is provided in surrounding relationship to an intervening reduced end of the tubular piston rod portion 96. The lost motion elements 158 are spaced apart at all times a distance equal at least to the length of a spacer sleeve 161 and normally the lost motion elements are at a somewhat greater distance apart so as to form one or more included gaps 160 between the spacer sleeve 161 and the respective lost motion elements 158.

It will be noted in Figure 2 that the outer periphery of the lost motion elements 158 is engaged by a nut 155 threadably received in the tubular nut portion 97 and by an adjacent spacer sleeve 153 which clamps the blanking element 150 against a shoulder in the tubular nut portion 97. The inner periphery of the lost motion elements 158 is engaged by the shoulder 154 and by the nut 156 carried by the tubular piston rod portion 96. Thus as the tubular nut portion 97 reciprocates in either axial direction, one or the other of the lost motion elements 158 is moved against the opposition of a spring 162 which may be provided in the space therebetween if desired and in the direction of the other lost motion element 158 such that there is a tendency to close up one or the other of the gaps 160. If the reaction thrusts of the tubular piston rod portion 96 happen to be substantial, one of the gaps 160 is entirely closed up and a direct drive connection results from the tubular nut portion 97 and the hollow piston rod portion 96 carrying the lost motion connection 95. On the other hand, a direct drive connection is always present between the tubular nut portion 97 and the valve-operating-rod 144 such that no lost motion is required to be taken up before the valve 146 responds to every movement of translation of the tubular nut portion 97.

The hollow interior 95 of the tubular piston rod portion 96 communicates with a reduced bore 165 at one end of the latter having a considerably smaller inside diameter. An O-ring-type seal 164 carried by the valve-operating-rod 144 is received in the bore 165.

The present steering unit of Figure 2 and any modifications thereof hereinafter disclosed is designed for the purpose of providing a power boost action such that when the valve 146 is disturbed and moved from its neutral relative position, a pressure differential is caused to be exerted across the double acting piston 134 and the piston is designed to move in the direction of the displacement of the valve 146 with a resulting valve neutralizing or followup motion. In the event of the failure of the pressure fluid system, a direct mechanical thrust is transmitted to the piston 134 through the lost motion joint 95 and the tubular piston rod portion 96 of the two-piece shaft containing the lost motion joint 95, and in such event the piston is likewise moved in a direction tending to follow, but somewhat lagging, the movement of the valve 146. At all events, however, any motion of the piston 134 becomes manifest by a similar motion of the tubular piston rod 140 extending into the return chamber 124 in the bottom end 38 of the multi-sectioned casing 36. It will be noted that one of the lip seals 130 engages the outer surface of the tubular piston rod portion 96 and has the lip thereof so directed as to be disposed in the natural direction of movement of the tubular piston rod portion 96 at all times during which a substantial fluid pressure is manifestly acting against the end structure 138 of the double acting piston 134. The other lip seal 130 is similarly directed with respect to the tubular piston rod 140. The hollow interior 141 of the tubular piston rod 140 conducts fluid being exhausted from the motor through the valve 146 in a manner subsequently to be described and past an opening 174 formed in the piston rod 140 so as to discharge the returned fluid into the return chamber 124.

Figure 3:
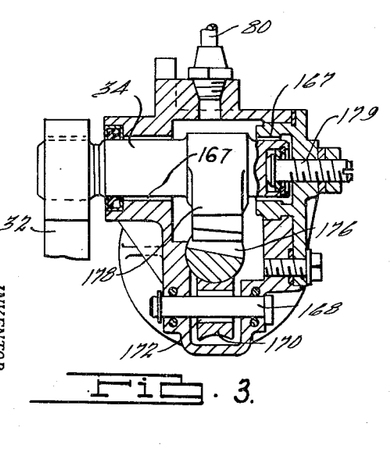
Figure 3 is a transverse section in elevation taken at the base of the steering unit.

In Figures 2 and 3, rockshaft 34 to which the depending pitman arm 32 is splined, is journalled in a set of transversely disposed coaxial bearings 167 which provide a straddle-type mounting for the rockshaft 34. A countershaft 168 is disposed in transverse alignment with the rockshaft 34 and is contained in the same transverse plane therewith.

A peripherally grooved roller 170 is mounted on a set of needle bearings 172 which are supported by the countershaft 168 as a journal. A set of rack teeth 176 is formed on the end of the tubular piston rod 140 outwardly of the return opening 174, the end of the piston rod 140 being of a generally semi-circular cross section. While the plane of the crowns of the rack teeth 176 is shown to be parallel to the axis of the countershaft 168, the teeth 176 themselves are formed along a relatively slanted axis of generation with the result that the rack teeth 176 have an inclined or wedging relationship with respect to the part or parts immediately associated thereadjacent. The arcuate surface of the semi-circular end of the piston rod 140 is supportedly received in the peripheral groove of the roller 170, and lateral thrusts to which the rod 140 is subjected are taken up by the reaction on the roller 170. The wedge-shaped rack teeth 176 are enmeshed with a set of crown teeth formed on a tapered gear sector 178, the crowns of the teeth being likewise parallel to the axis of the countershaft 168. The rockshaft 34 with which the gear sector 178 is integral, is shiftably adjustable along its own axis by means of a thrust screw 179 such that the teeth of the tapered sector 178 and the rack teeth 176 may be wedged into a close and intimate engagement with one another defining a virtual pitch cylinder which is parallel to the axis of the countershaft 168 and to the crowns of the respective sets of meshing teeth.

Figure 4:
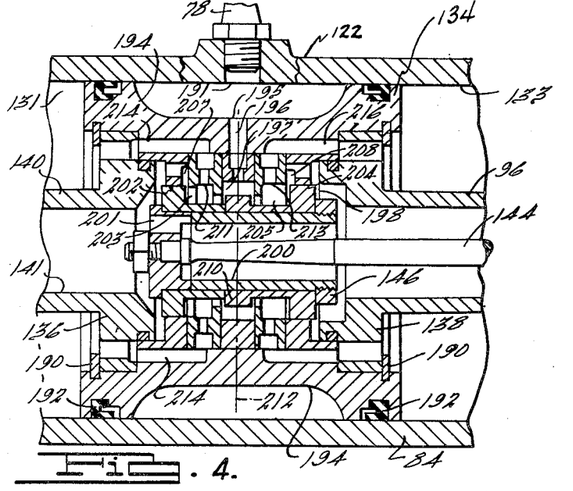
Figures 4, 5, 6 are sequential figures of operation and represent fragmentary enlargements of an appropriate portion of Figure 2.

In Figure 4, the body portion of the hollow piston 134 has the respective end structures 136, 138 individually fastened thereto by means of one or more snap rings 190. Each of the ends of the piston 134 is peripherally grooved to receive a piston ring structure 192 which sealingly engages the walls of the working cylinder 122. The body of the piston 134 has a main annular recess 194, which is long enough axially of the piston to permit an end port 191 for the supply pipe 78 always to be in communication with the main annular recess 194. The middle of the floor of the annular recess or groove 194 contains one or more radial passages 196, each of which terminates therein in a port 195 and which thus constantly communicates with the previously noted supply pipe port 191. The radial passages 196 extend radially inwardly to a valve inlet chamber 197 formed in the hollow piston interior, generally indicated at 198. The hollow interior 198 of the piston 134 communicates with the radial space between the valve-operating-rod 144 and the tubular piston rod portion 96, such space being sealed off at the opposite end by means of the seal 164 of Figure 2. The valve 146 is unitarily acting and freely movable within the hollow interior 198 of the piston 134 and has a cup-like hollow interior 200 provided at one end with one or more longitudinally extending passages 201 therethrough which together therewith establish free internal communication from one end of the interior 198 of the piston to the other. The valve 146 is a spool-type valve and has a transversely protruding annular land 210 of a predetermined height at a mid portion thereof and a set of equal end lands 202, 204 similar thereto but of a slightly greater height or diameter provided at the respective ends thereof. The land 202 is arranged for movement in one direction to shift and close a fluid escape gallery 207 past one end of the valve 146 and leading to the return passage 141. Movement in the opposite direction causes the land 204 to shift and close a fluid escape gallery 208 past the other end of the valve 146 and into the hollow interior 200 and the passages 201 which communicate with the hollow interior 141 of the tubular piston rod 140. The land 210 intermediate the lands 202, 204 at the end portions of the valve 146 has a neutral or central relative position with respect to a central reference line 212, in which the land 210 divides the stream of pressure fluid from the inlet 197 into two substantially equal parts. Thus the land 210 slightly uncovers both sides of the valve inlet chamber 197, and at the same time the end land 202 slightly uncovers the adjacent surfaces of the hollow piston interior 198 so as to permit fluid flow to and through the gallery 207 past the end of the valve 146. Similarly, the end land 204 slightly uncovers the adjacent surfaces of the hollow piston interior 198 so as to permit fluid flow to and through the gallery 208 past the end of the valve 146. In the actual physical embodiment contemplated, the amount of these simultaneous clearances in neutral position of the valve 146 is made to be 0.005" at each effective side of each of the valve 146.

Figures 5, 6:
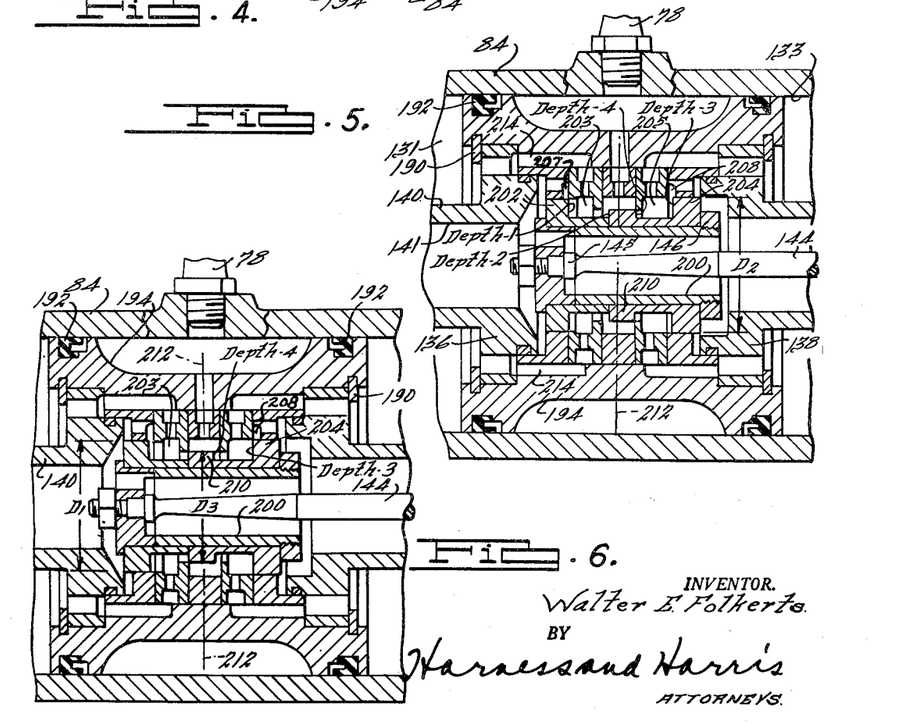

In Figures 5 and 6, which are sequential figures to Figure 4, the results of such movement of the lands 202, 204 in one direction or in the opposite direction as described, are illustrated and the full significance of the different diametered lands 202, 210 and 204, 210 is now set forth. The lands 202, 204 have diameters indicated at $D_1$ and $D_2$ respectively and equal to one another, whereas the land 210 has the relatively smaller diameter $D_3$, thus resulting in the one intervening groove 203 having deep and shallow opposite sides of magnitudes Depth-1 and Depth-2 respectively, and the other groove 205 having deep and shallow opposite sides of the magnitudes Depth-3 and Depth-4 respectively. When, due to appropriate operator-operation causing the valve rod 144 and the valve 146 to be pulled to the right as in Figure 5, the end land 202 closes off the escape gallery 207 leading to drain, fluid pressure is caused to build-up in the groove 203, the connecting passage 214, and the working chamber 131. The diameter $D_1$ is recommended to be 1⅜" in one particular installation, and the diameter $D_3$ is arranged to be enough smaller than 1⅜", for the areas corresponding to the depths Depth-1 and Depth-2 to have a recommended differential of 0.5 sq. in. A fluid pressure build-up to 600 lbs./sq. in. in the groove 203 will thus produce a valve self-centering effort of 300 lbs. The land 204 may conveniently have the diameter $D_2$ thereof equal to the diameter $D_1$, with the result that a similar shift of the valve 146 to the left as in Figure 6 will produce an opposite valve self-centering effort of 300 lbs., once the pressure builds up to 600 lbs./sq. in. inside the groove 205.

Figure 7:
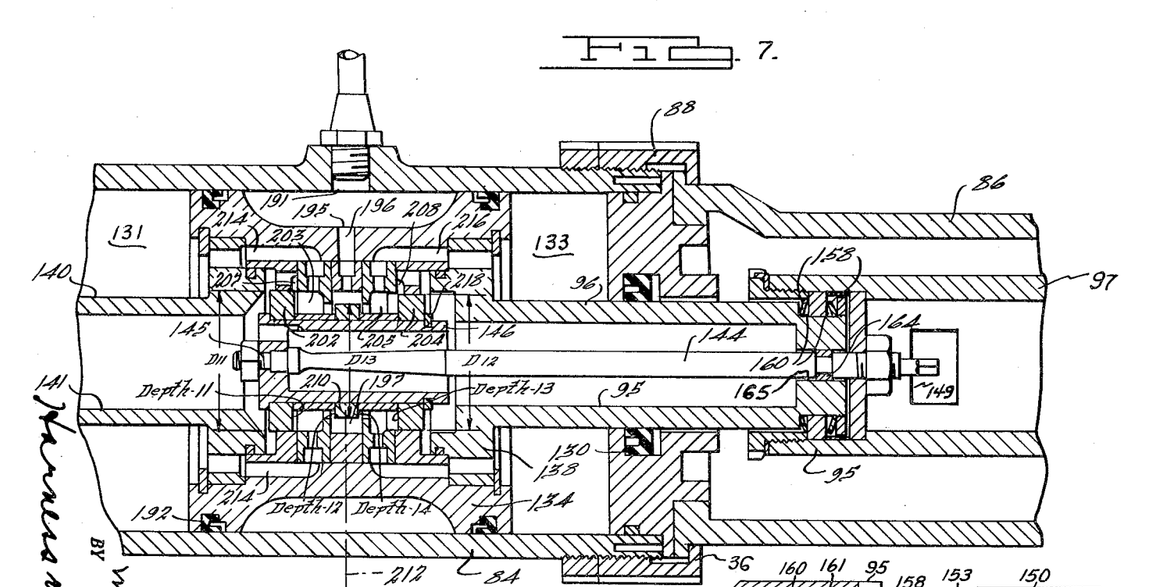
Figure 7 is a view similar to Figure 4, but showing a modification of the invention.
Figure 8:
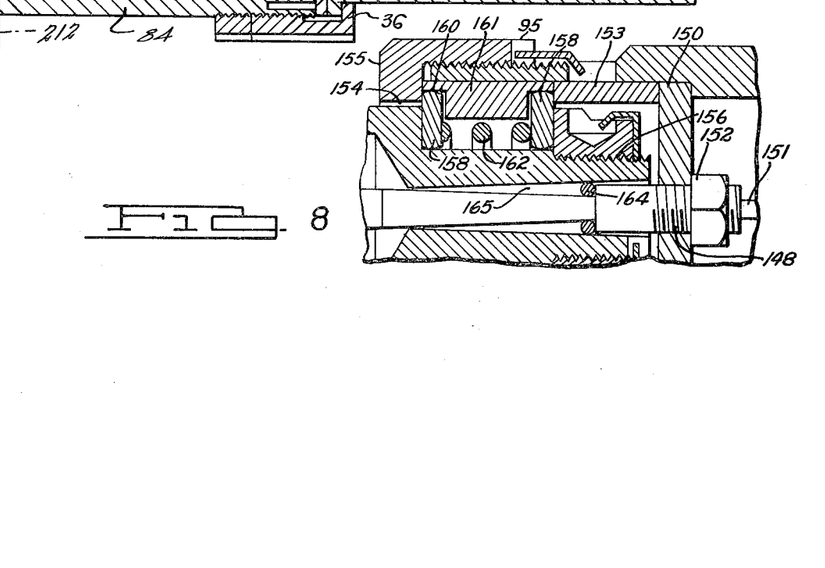
Figure 8 is an enlarged view of the lost motion connection of Figure 2.

In the modification of Figure 7, the multi-section casing 36 has a lost motion connection 95 and a single valve element 146 corresponding to and very similar to the connection and valve of the preceding embodiment. Thus, in the connection 95 according to Figure 7, the spaced apart lost motion elements or spring washers 158 are dished to provide take-up clearances or gaps 160 and when the connection 95 is collapsed, the elements 158 are separated one relative to the other until one gap 160 or the other gap 160 disappears.

The valve 146 has a valve inlet 197 which is supplied by a piston passage 196 and a port 195 in constant communication with an internal cylinder wall port 191. The valve 146 incorporates a central sleeve having, at one end, an external shoulder and also a partial transverse wall to which a threaded portion 145 of a valve operating rod 144 is attached by means of a fastening nut. At the other end, the central sleeve of the valve 146 has a groove for receiving a tapered snap ring 218 which maintains a spaced apart relationship with respect to the above described shoulder on the sleeve. Between the snap ring 218 and the sleeve shoulder, a series of coaxial ground rings is received, and such series of rings provides the lands and grooves for the valve. Thus, the end ring having the outside diameter $D_{11}$ forms the end land 202, and the central ring having the diameter $D_{13}$ forms the central land 210, and together these lands 202, 210 cooperate in spaced apart relationship to define a valve groove or recess 203 having a deep side of Depth-11 and a shallow side of Depth-12. Similarly, the opposite end ring having the outside diameter $D_{12}$ forms the end land 204, which together with the central land 210 defines a valve groove or recess 205 having a deep side of Depth-13 and a shallow side of Depth-14. The end land 202 and the diameter $D_{11}$ are slightly larger than the respective end land 204 and diameter $D_{12}$ for the reasons hereinafter set forth.

The side faces of these land-forming rings can be ground on a Blanchard grinding machine such that they are kept in true to tolerances of 0.0002", and the outside diameters of these rings can be accurately ground to similarly close or even closer tolerances on a centerless grinder. The diameter $D_{12}$ is recommended to be 1⅜" in one particular installation, and the diameter $D_{13}$ is arranged to be enough smaller than 1⅜", for the areas of revolution having the Depth-12 and Depth-13 to have a recommended differential of 0.5 sq. in.; in this same installation, which is used herein merely for purposes of illustration, the diameter $D_{11}$ is recommended to be 1.420" which from standpoint of area encompasses 0.1 sq. in. more than a circle having the previously noted diameter $D_{13}$ equalling 1⅜" or 1.375". Accordingly, the areas of revolution having the depths Depth-11 and Depth-13 have a differential which is 0.1 sq. in. greater than the previously noted differential and equal to 0.6 sq. in. In this same illustrative installation, the diameter of the valve operating rod 144 is 5/16", and it will be noted that the space between the rod 144 and the surrounding interior 95 is exposed to the drain pressure of the drain conduit 141, and also the bore 165 and the rod seal 164 are exposed to such drain pressure. The resulting pressure drop across the seal 164 has a tendency to push the rod 144 through bore 165 in the direction of the actuator or tubular nut portion 97, and this tendency is overcome due to the thrust reaction of the actuating nut 97.

The characteristics of the least protruding valve land 210 of Figure 7 are the same as the characteristics of the corresponding valve land of Figure 4 in that the land equally divides the flow of pressure fluid from the inlet 197 into split paths, one leading to the groove 205 adjacent the greater protruding land 204 and the other leading to the groove 203 adjacent the greatest protruding land 202.

In the operation of the embodiments of Figures 1–7, the valve rod 144 and the valve 146 can, by appropriate manual operation of the steering wheel 10 and steering shaft 99, be pulled to the right, for instance, as shown in Figure 5, so as to cover the oil escape gallery 207 and the right side of the inlet 197 to a greater degree while relatively uncovering the escape gallery 208 and the left side of the inlet 197. Accordingly, a pressure build-up will occur in the annular groove 203 and the already filled working chamber 131 will be subjected to pump pressure and the pump pressure will be caused to increase. The annular groove 205 connected to the opposite working chamber 133 will be opened to a greater degree to the escape passage 208 past the end of the valve 146, and the groove 205 and the working cylinder 133 will be exposed only to the back pressure existing in the drain line 141 and in the valve interior 200. Accordingly, a pressure differential will be created across the piston 134 and the piston will be caused to move to the right, as viewed in Figure 5. On the other hand, when the valve-operating-rod 144 and the valve 146 are pushed and caused to move to the left, for instance as in Figure 6, by appropriate motion of the steering shaft 99 and the steering wheel 10, a pressure build-up caused by an increasing pump pressure will occur in the annular groove 205 communicating with the working chamber 133, and the working chamber 131 will be connected to a greater degree to the oil escape gallery 207 and the drain passage 141, thus resulting in a pressure differential which will cause the piston 134 to move to the left for instance as viewed in Figure 6.

It is apparent that, during the above operations, the hollow interior 95 of the piston rod portion 96 will be exposed to drain pressure in either operating position of the valve and accordingly the bore 165 will also be exposed to drain pressure. Thus in both the embodiment of Figure 4 and of Figure 7, the valve-operating-rod 144 and the seal 164 in the bore 165 will be exposed to the action of an unopposed fluid pressure at one side thereof tending to thrust the valve-operating-rod 144 to the right inside the bore 165, and this action provides a false sense of hydraulic reaction which though present only to a slight degree, subjects the actuator or tubular nut portion 97 to a false sense of reaction by acting in assistance to movement of the valve-operating-rod 144 when the latter is being pulled and shifted to the right and by acting in opposition to movement of the valve-operating-rod 144 when the latter is being pushed and shifted to the left. As the hydraulic reaction effective on the valve element 146 having the three different diameters $D_{11}$, $D_{12}$, $D_{13}$, in the particular embodiment of Figure 7 tends to prevent collapse of the lost motion elements 158 in the lost motion joint in the direction, for instance, of movement of the tubular nut portion or actuator 97 to the left, the hydraulic force acting on the piston rod 144 on the pressure side of the seal 164 acts in aid of the force of the relatively smaller one 205 of the grooves 203, 205 (that is, the groove 205 having the opposite sides of Depth-13 and Depth-14 yielding a differential in areas of 0.5 sq. in.) to communicate a sense of hydraulic reaction to the driver of the vehicle while opposing relative collapse of the lost motion joint 95. Contrariwise, when the tubular nut portion or actuator 97 is moved to the right in the embodiment of Figure 7, the hydraulic pressure drop across the seal 164 acts in opposition to the force exerted on the relatively larger one 203 of the grooves 203, 205 (that is, the groove 203 having the opposite sides of Depth-11 and Depth-12 yielding a differential in area of 0.6 sq. in.) but by reason of the fact that the area differential between the groove sides 203 is larger than the area differential between the groove sides 205, the difference in the differential cross sectional areas can thus be made effective to cancel out the one-sided effect of the valve-operating-rod 144 and the seal 164 in the off center positions of the valve 146; whereas in the embodiment of Figure 4, the pressure drop across the seal 164, being of a small magnitude anyway, is not hydraulically neutralized in any position of the valve 146 but may, however, be completely neutralized by the provision of the mechanical spring 162 shown in Figure 1. In the illustrated example of applicant's embodiment of Figure 7, where the diameter of the valve operating rod is 5/16" as previously recommended, the thrust due to the valve rod 144 causing the false sense of feel, will be 30 lbs. when the drain pressure is maintained at about 40 lbs./sq. in. When the self-centering valve 146 is shifted far enough to the left with respect to a central reference line indicated at 212 in Figure 7, to cause the pump pressure to reach a commonly produced magnitude of 600 lbs./sq. in., the valve groove 205 inherently exposes a differential area of 0.5 sq. in. subject to the 600 lbs./sq. in. pressure, which causes a rightward thrust supplemented by the 30 lb. rightward hydraulic thrust by the rod 144 and producing an aggregate total of 330 lbs. centering force. When the valve 146 is shifted a corresponding amount to the right with respect to the central reference line 212, the groove 203 inherently exposes a differential area of 0.6 sq. in. subjected to 600 lbs./sq. in. which causes a leftward thrust opposed by the 30 lb. rightward hydraulic unbalance thrust due to the rod 144, and producing a net total of 330 lbs. centering thrust the same as before. Hence, there occurs no false sense of feel in the valve of the embodiment of Figure 7, but only the true desired force of proportional hydraulic reaction.

The overall operation of the steering unit of Figures 1–7 and including the respective specific embodiments of Figures 4 and 7 thereof is as follows. When the operator rotates the steering wheel 10, the steering shaft 99 rotates in either a clockwise or a counterclockwise direction, for instance, a direction which corresponds to a downward movement of the tubular nut portion 97 as in a right hand turn. Such rotary movement is converted by means of the re-circulating type ball joint 95 into translatory motion of reciprocation which immediately becomes manifest in similar movement of the valve-operating-rod 144 and the valve 146 in a direction downwardly in respect to the multi-sectioned casing 36. At the same time, the lost motion elements 158 whether spring loaded or not, undergo a collapsing movement one relative to the other so as to permit at least a partial take-up in the clearance of the gaps 160. Normally, the response of the continuously moving pressure fluid is practically instantaneous with valve movement, and before any considerable amount of the gap 160 disappears, the valve 146 controlling the application of fluid pressure to the working chamber 131 or 133 will create a pressure differential causing the piston 134 to attempt to follow the valve 146 in the movement of the latter. The opposite working chamber is at the same time connected to the drain pipe 80. The hollow piston rod 140 moves with the piston, and by means of the rack teeth 176 thrusts against the sector 178 to cause a resulting power boost movement of the pitman arm 32 and front steering linkage. Such power assistance may amount to perhaps as much as 80% or more of the total steering effort necessary to turn the front wheels 16. In the ball joint formed by the worm 104 and the tubular nut portion 97, the right hand rotation of the steering shaft causes the balls 110 to be circulated upwardly in the helical grooves and downwardly through the ball conveyor 116, 114 so as to be re-circulated into the helical grooves.

During a left hand turn of the steering unit, the tubular nut portion 97 tends to climb upwardly along the worm 104 and draw the valve 146 to a position upwardly with respect to the surrounding piston and just opposite to the position previously described. In such instance, the controlled pressure fluid is applied in an opposite direction to cause piston movement to the right in the same direction as the valve. Such movement of the piston causes the pitman arm 32 and the drag link 30 to move rearwardly relative to the vehicle.

As herein disclosed, the invention is shown in the environment of an open-valve-type system in which there is a continuous communication maintained between the control valve and the source of pressure fluid and between the control valve and the ends of the piston but in which the circulation is effective at all times between only the control valve the pressure source. It is evident that the invention will be equally effective in pressure fluid systems in which pressure fluid is being continuously circulated at all times not only to the control valve, but also is being continuously circulated on past the control valve when in neutral position and through the working chambers at each end of the piston. So also the drawing shows two embodiments of an hydraulic steering arrangement which may be described in operation as a combined proportional hydraulic and mechanical feel back system but indeed, it is not essential that mechanical feel back be employed. The lost motion elements 158 in the two embodiments are shown arranged to be normally separated and upon removal of slack in the lost motion connection to be moved relatively closer together in one embodiment and to be farther separated in the other embodiment, but self-evidently, either arrangement can be used to advantage in each embodiment.

Variations within the spirit and scope of the invention described are equally comprehended by the foregoing description.

What is claimed is:

1. Power steering apparatus in combination with vehicle-guiding means and a cylinder retained power piston operatively connected with the latter and being slidable between the ends of the cylinder to perform work, said piston containing a fluid chamber having ports in communication with the ends of the cylinder, a movable spool valve element in the piston chamber having grooves registering with said chamber ports and being mutually defined by transversely protruding annular valve lands at the respective end portions of the valve element and a transversely protruding intermediate annular land of a different diameter from each of said end lands such that one side of each groove is of a different depth than the opposite side, means through which pressure fluid is introduced to an inlet to said piston chamber including a passageway and a port in said piston communicating with a port in said cylinder, said valve element having a hollow interior and said intermediate valve land controlling said piston chamber inlet so as selectively to direct fluid into said grooves, there being interior surfaces formed in said piston chamber slidably receiving said end lands and cooperating with the same to selectively prevent fluid from flowing past alternate ones of the respective ends of the valve, thereby causing fluid pressure to build up at alternate and opposite ones of said ports and the associated valve grooves, and to simultaneously allow fluid from the other ones of said ports to flow past the other of said ends upon relative movement of said valve with respect to said piston in alternate axial directions, and a driver's control member having a fixed connection with said valve element and a lost motion connection with said piston for causing relative movement between said valve element and said piston in one direction or the other and a corresponding build up of pressure at the corresponding port in the above described manner, said control member forming an exhaust passage, the other ones of said ports communicating with said exhaust passage around the axial ends of said valve element, the hollow interior of said valve element forming a portion of said exhaust passage, said different depthed sides of the associated groove presenting dissimilar areas exposed to and differentially acted upon by the fluid pressure so as to cause the valve element to react against the driver's control member and transmit thereto a sense and feel of the resistance being overcome by the power piston.

2. Power steering apparatus in combination with vehicle-guiding means and a cylinder retained power piston operatively connected with the latter and being slidable between the ends of the cylinder to perform work, said piston containing a fluid chamber having ports in communication with the ends of the cylinder, a movable spool valve element in the piston chamber having grooves registering with said chamber ports and being mutually defined by transversely protruding annular valve lands at the respective end portions of the valve element and a transversely protruding intermediate annular land of a different diameter from each of said end lands such that one side of each groove is of different depth than the opposite side, means through which pressure fluid is introduced to an inlet to said piston chamber including a passageway and a port in said piston communicating with a port in said cylinder, said valve element being hollow and said intermediate valve land controlling said piston chamber inlet so as selectively to direct fluid into said grooves, there being interior surfaces formed in said piston chamber slidably receiving said end lands and cooperating with the same to selectively prevent fluid from flowing past the respective ends of the valve, thereby to cause fluid pressure to build up at said ports and the associated valve grooves, and a driver's control member having operative connection to said valve element for causing movement of the same in one direction or the other and a corresponding build up of pressure at the corresponding port in the above described manner, said different depthed sides of the associated groove presenting dissimilar areas exposed to and differentially acted upon by the fluid pressure so as to cause the valve element to react against the driver's control member and transmit thereto a sense and feel of the resistance being overcome by the power piston, said operative connection including an intervening valve operating rod connected to said valve, said valve end lands being each of a different diameter from the other whereby the effective differential area of each valve groove is different from the other and causes the valve to transmit to the rod a different force reaction in one direction of valve shift with respect to a central reference line than the force reaction in the opposite direction but of the same magnitude of valve shift with respect to the same central reference line, all said force reactions being proportional however to the resistance encountered by said power piston in either direction of movement thereof.

3. Power steering apparatus in combination with vehicle-guiding means and a cylinder retained power piston operatively connected with the latter and being slidable between the ends of the cylinder to perform work, said piston containing a fluid chamber having ports in communication with the ends of the cylinder, a movable spool valve element in the piston chamber having grooves registering with said chamber ports and being mutually defined by transversely protruding annular valve lands at the respective axial end portions of the valve element and a transversely protruding intermediate annular land of a smaller diameter from each of said end lands such that one side of each groove is of a different depth than the opposite side, means through which pressure fluid is introduced to an inlet to said piston chamber, said valve element having a hollow interior and said intermediate valve land controlling said piston chamber inlet so as selectively to direct fluid into said grooves, there being interior surfaces formed in said piston chamber slidably receiving said relatively larger end lands and cooperating with the same to selectively prevent fluid from flowing past alternate ones of the respective ends of the valve, thereby causing fluid pressure to build up at alternate and opposite ones of said ports and the associated valve grooves, and to simultaneously allow fluid from the other ones of said ports to flow past the other of said ends upon relative movement of said valve with respect to said piston in alternate axial directions, and a driver's control member having a fixed connection with said valve element and a lost motion connection with said piston for causing relative movement between said valve element and said piston in one direction or the other and a corresponding build up of pressure at the corresponding port in the above described manner, said control member forming an exhaust passage, means for providing communication between other ones of said ports and said exhaust passage, said hollow interior of said valve element forming a portion of said exhaust passage, said different depthed sides of the associated groove presenting dissimilar areas exposed to and differentially acted upon by the fluid pressure so as to cause the valve element to be self-centering when displaced and to react against the driver's control member and transmit thereto a sense and feel of the resistance being overcome by the power piston.

4. A fluid pressure power mechanism comprising a double-acting differential fluid pressure motor having a pressure movable member therein and being provided with a fluid ported hollow interior, tubular piston rod means connected to such member, a unitarily acting, freely movable single valve means within the motor adapted to be supplied with pressure fluid and cooperating with the ports and surfaces of the hollow interior therein provided, a valve operating rod extending through at least a portion of the piston rod means, a toothed power transmitting connection carried by the piston rod means externally of said valve rod and said motor, a thrust transmitting connection carried by the valve rod externally of said piston rod means and said motor, and an operator's control member in axial alignment with said piston rod means and directly connected to said last-named connection, there being two valve grooves provided which register with said fluid ports and which are mutually defined by annular lands protruding transversely from said single valve means at the respective end portions thereof and an intermediate annular land protruding transversely therefrom, each said land being of a different diameter than the other lands and so separately defining said grooves between the intermediate land and the lands at the end portions of the valve means that one side of each groove is of a different depth than the opposite side and different from both sides of the other groove, said single valve means being connected to said valve rod so as to be shiftably displaceable under control of said operator's control member in varying the proportions of flow of pressure fluid through the motor with the lands selectively controlling the flow through the ports opposite the respective grooves and to the opposite ends of the motor to drive said pressure movable member, said different depthed sides of the associated groove presenting dissimilar areas exposed to and differentially acted upon by the fluid pressure so as to cause the valve when shifted with respect to a central reference line to react against the valve rod with a force proportional to the resistance encountered by the pressure movable member in either direction of movement thereof, the aforesaid force reaction differentially effective in one said groove being of a different magnitude than on the other dissimilar groove for equal amounts of valve displacement in the opposite directions of movement thereof with respect to said central reference line.

5. A fluid pressure power mechanism comprising a double-acting differential fluid pressure motor having a pressure movable member therein provided with a hollow interior defining a first chamber, working chambers for pressure fluid formed in said motor at opposite sides of said pressure movable member, freely movable single valve means in said first chamber having a plurality of axially spaced radial protrusions and a valve inlet there-adjacent controlled by one said protrusion so as to produce normally equally split fluid paths, said valve means further having an axial passage therethrough means through which pressure fluid is introduced into said valve inlet including a passageway and a port in said pressure movable member constantly communicating with an internal port in said motor, means establishing separate communication paths between said controlled valve inlet and the chambers at the opposite sides of the pressure movable member, each including a passageway and a port in said pressure movable member constantly communicating with one of the resulting recesses in said single valve means defined by said one protrusion and one other said protrusion, said one protrusion being shiftable with respect to a central reference line to vary the proportioning of the pressure fluid flow from the valve inlet to certain ones of said valve recesses, tubular piston rod means connected to said pressure movable member and forming an exhaust passage means, the other one of said respective valve recesses communicating with said exhaust passage means around an adjacent end of said valve means, the axial passage through said valve means forming a portion of said exhaust means, a power transmitting connection carried by said tubular piston rod means externally of said motor for moving a work performing element, a driving member disposed externally of said power mechanism, and a valve rod extending through at least a portion of the tubular piston rod means secured to said driving member and having a lost motion connection with said piston rod externally of said motor, the axial sides of each said recess being of a dissimilar area so as to present a differential in areas exposed to and differentially acted upon by the fluid pressure when said valve means is moved in an appropriate direction to shift said one protrusion with respect to said central reference line, said single valve means being connected to said valve rod and transmitting thereto, in either axial direction of movement thereof, a force reaction dependent upon the differential action above and proportional to the resistance encountered by said pressure movable member in moving said element to perform work.

6. A fluid pressure power mechanism comprising a double-acting differential fluid pressure motor having a pressure movable member therein provided with a hollow interior defining a first chamber, working chambers for pressure fluid formed in said motor at opposite sides of said pressure movable member, freely movable single valve means in said first chamber having a plurality of axially spaced radial protrusions and a valve inlet thereadjacent controlled by one said protrusion so as to produce normally equally split fluid paths, means through which pressure fluid is introduced into said valve inlet including a passageway and a port in said pressure movable member constantly communicating with an internal port in said motor, means establishing separate communication paths between said controlled valve inlet and the chambers at the opposite sides of the pressure movable member, each including a passageway and a port in said pressure movable member constantly communicating with one of the resulting recesses in said single valve means defined by said one protrusion and one other side protrusion, one protrusion being shiftable with respect to a central reference line to vary the proportioning of the pressure fluid flow from the valve inlet to the respective said valve recesses, tubular piston rod means connected to said pressure movable member, a power transmitting connection carried by said tubular piston rod means externally of said motor for moving a work performing element, a driving member disposed externally of said power mechanism, and a valve rod extending through at least a portion of the tubular piston rod means secured to said driving member and having a mechanical lost motion connection with said piston rod externally of said motor, the axial sides of each said recess being of a dissimilar area so as to present a differential in areas exposed to and differentially acted upon by the fluid pressure when said valve means is moved in an appropriate direction to shift said one protrusion with respect to said central reference line, said single valve means being connected to said valve rod and transmitting thereto, in either direction of movement thereof, a force reaction dependent upon the differential action above and proportional to the resistance encountered by said pressure movable member in moving said element to perform work, the effective differential in areas of the protrusion defining one said recess being different from the effective differential in areas of the protrusion defining the other recess that such valve force reaction for a given magnitude of movement in one axial direction is different from the force reaction for the same magnitude of movement in the opposite direction.

7. A fluid pressure power mechanism comprising a double-acting differential fluid pressure motor having a pressure movable member therein provided with a hollow interior defining a first chamber, working chambers for pressure fluid formed in said motor at opposite sides of said pressure movable member, freely movable single valve means in said first chamber having an axial passage therethrough and having a plurality of spaced apart enlarged diameter portions and a valve inlet thereadjacent controlled by one said enlarged diameter portion so as to produce normally equally split fluid paths, means through which pressure fluid is introduced into said valve inlet including a passageway and a port in said pressure movable member constantly communicating with an internal port in said motor, means establishing separate communication paths between said controlled valve inlet and the chambers at the opposite sides of the pressure movable member, each including a passageway and a port in said pressure member constantly communicating with one of the resulting recesses in said single valve means defined by said one enlarged diameter portion and one other enlarged diameter portion, tubular piston rod means connected to said pressure movable member and forming an exhaust passageway, said one resulting recess communicating with said exhaust passageway through said axial passage of said single valve means, said one portion being shiftable with respect to a central reference line to vary the proportioning of the pressure fluid flow from the valve inlet to the respective said valve recesses, a power transmitting connection carried by said tubular piston rod means externally of said motor for moving a work performing element, a driving member disposed externally of said power mechanism, and a valve rod extending through at least a portion of the tubular piston rod means secured to said driving member and having a lost motion connection with said piston rod externally of said motor, the diameter of said one portion being different from the diameters of the other enlarged diameter portions and the axial sides of each said recess thereby being of dissimilar area so as to present a differential in areas exposed to and differentially acted upon by the fluid pressure when said valve means is moved in one of two opposite axial directions to shift said one portion with respect to said central reference line, said single valve means being connected to said valve rod and transmitting thereto, in either direction of movement thereof, a force reaction dependent upon the differential action above and proportional to the resistance encountered by said pressure movable member in moving said element to perform work.

8. A fluid pressure power mechanism comprising a double-acting differential fluid pressure motor having a pressure movable member therein provided with a hollow interior defining a first chamber, working chambers for pressure fluid formed in said motor at opposite sides of said pressure movable member, freely movable single valve means in said first chamber having a plurality of spaced apart enlarged diameter portions and a valve inlet thereadjacent controlled by one said enlarged diameter portion so as to produce normally equally split fluid paths, means through which pressure fluid is introduced into said valve inlet including a passageway and a port in said pressure movable member constantly communicating with an internal port in said motor, means establishing separate communication paths between said controlled valve inlet and the chambers at the opposite sides of the pressure movable member, each including a passageway and a port in said pressure movable member constantly communicating with one of the resulting recesses in said single valve means defined by said one enlarged diameter portion and one other enlarged diameter portion, said one portion being shiftable with respect to a central reference line to vary the proportioning of the pressure fluid flow from the valve inlet to the respective said valve recesses, tubular piston rod means connected to said pressure movable member, a power transmitting connection carried by said tubular piston rod means externally of said motor for moving a work performing element, and a valve rod extending through at least a portion of the tubular piston rod means and having a feel-back transmitting connection externally of said motor, the diameter of said one portion being different from the diameters of the other enlarged diameter portions and the sides of each said recess thereby being dissimilar so as to present a differential in areas exposed to and differentially acted upon by the fluid pressure when said valve means is moved in one of two opposite directions to shift said one portion with respect to said central reference line, said single valve means being connected to said valve rod and transmitting thereto, in either direction of movement thereof, a force reaction dependent upon the differential action above and proportional to the resistance encountered by said pressure movable member in moving said element to perform work, the diameter of one of said one other enlarged diameter portions being respectively larger and smaller than the diameter of the said one portion and the remaining said other portion and the effective differential in areas of one said recess being thereby different from the effective differential in areas of the other recess to the extent that such valve force reaction as the foregoing for a given magnitude of movement in one direction is different from the force reaction for the same magnitude of movement in the opposite direction.

(References on following page)

References Cited in the file of this patent

UNITED STATES PATENTS

| | | | |
|---|---|---|---|
| 1,874,248 | Davis | Aug. 30, 1932 |
| 1,959,177 | Sassen | May 15, 1934 |
| 2,370,137 | Biggert, Jr. | Feb. 27, 1945 |
| 2,384,962 | Pohl | Sept. 18, 1945 |
| 2,526,709 | Tait | Oct. 24, 1950 |
| 2,528,901 | Morse | Nov. 7, 1950 |
| 2,605,854 | MacDuff | Aug. 5, 1952 |
| 2,628,594 | Teague | Feb. 17, 1953 |